March 25, 1930.  V. P. DIEDERICH  1,751,684
COMBINED VENT AND SAFETY VALVE
Filed June 18, 1928
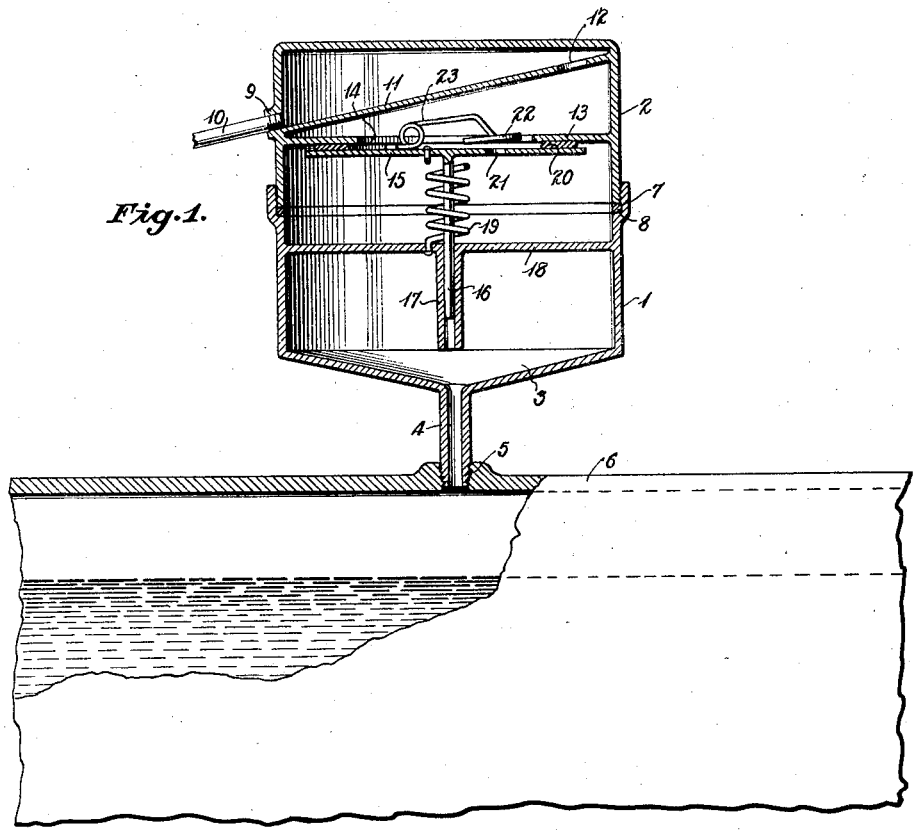
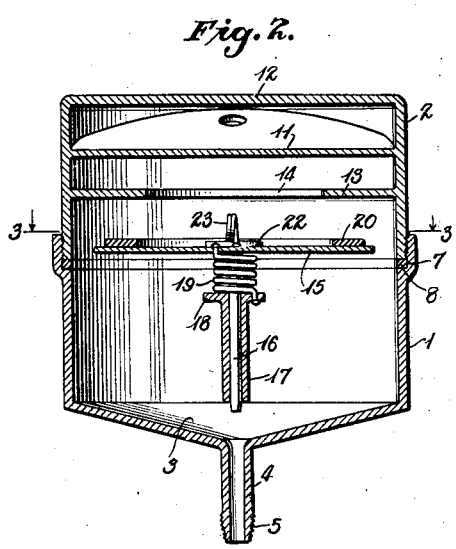
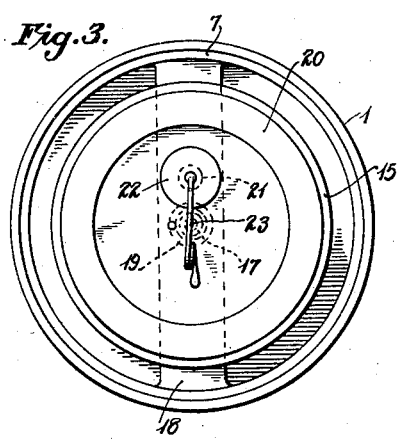
INVENTOR.
*Victor P. Diederich*
BY *William C. Linton*
ATTORNEY.

Patented Mar. 25, 1930

1,751,684

UNITED STATES PATENT OFFICE

VICTOR P. DIEDERICH, OF HOT SPRINGS, ARKANSAS

COMBINED VENT AND SAFETY VALVE

Application filed June 18, 1928. Serial No. 286,326.

This invention relates to improvements in combined venting devices for use in connection with those types of containers or tanks used for the storage of volatile liquids, such as ether or the like, the invention having for an object to provide a device of this character capable of being readily attached to a volatile liquid reservoir or tank whereby the same will be vented with the removal or pumping of a quantity of liquid therefrom, hence, facilitating such operation, but which, with an interruption or discontinuing of such outflow of liquid, will be immediately and automatically closed whereby to avoid the loss of gases therefrom into the atmosphere.

It is also amongst the principal desiderata of this invention to provide an attachment of the character mentioned embodying a pressure operable safety gas outlet means, the same being so constructed and arranged that when the pressure of gas within the tank abnormally increases, as by reason of its subjection to different temperatures, its movement to an open position will be caused by such excessive pressure and thereupon, a decreased pressure within the tank will be brought about by reason of exhaustion of the excess gases in the atmosphere, following which the safety outlet means will be allowed to automatically return to its closed position.

Other objects of the invention will be in part obvious and in part pointed out hereinafter.

In order that the invention and its mode of operation may be readily understood by those skilled in the art to which it appertains, I have in the accompanying drawings and in the detailed following description based thereupon, set out one possible embodiment of my invention.

In these drawings:

Figure 1 is a longitudinal section through the improved device, showing the same connected or attached to a portion of a volatile liquid storage tank, Figure 2 is a longitudinal section through the device showing the venting device in its open position, and Figure 3 is a transverse section taken on the line 3—3 of Figure 2 looking in the direction in which the arrows point.

Having further reference to the drawings in connection with which like characters of reference will designate corresponding parts throughout, the invention may be stated to comprise a casing formed of metal, composition material or of other suitable material, said casing including transversely divided sections 1 and 2, the section 1 being formed with a tapered bottom portion 3 having a concentrically arranged inlet neck or nipple 4 extended therefrom, the free end of which is tapered and screw-threaded as at 5 for quick and effectual connection with a screw-threaded opening formed in an appropriate portion of a volatile liquid containing tank indicated by the numeral 6.

The section 2 of the casing may be stated to comprise a cup like body having the outer peripheral walls adjacent the open end thereof screw-threaded and adapted to be turned into engagement with the internally screw-threaded and flanged portion 7 of the section 1; a packing or gasket 8 being interposed as between the marginal portions of said sections 1 and 2 whereby to bring about an effectual air tight connection or seal.

This section 2 is formed with an outlet opening or port 9, which, if desired, may have a conduit, pipe or like connection engaged therewith and extended to a point away from the attachment or into the open whereby to effect discharge of gases from the tank at a point comparatively remote therefrom. Also, the section 2 is provided with an internally arranged and diagonally disposed wall 11 having a port 12 formed in one portion of the same, for a purpose which will be subsequently described.

With a view toward providing means for controlling communication as between the inlet portion 4 and the outlet port 9 of the device, I fixedly mount within the section 2 of the casing, a partition wall 13 having a circular port 14 therein and normally close said port through the medium of a disk valve 15 provided with a depending stem portion 16 slidably received in the tubular guide 17 carried upon a cross bar 18 fixedly secured at the opposite extremities to portions of the inner side walls of the section 1; an expansible coiled spring 19 being engaged about a portion of the stem 16 and having its upper end bearing upon or connected to a part of the adjacent side of the disk valve 15 while the opposite extremity of the spring has connection with a portion of the cross bar 18. Consequently upon this interpositioning of the spring 19 as between the valve 15 and the cross bar 18, it will be understood that the former will be normally held in an engaged position over the port 14 of the partition wall 13 within the section 2 and consequently thereupon, communication between the inlet neck or nipple 4 and the outlet port 9 of the device will be interrupted.

That an effectual sealing connection will be had between the disk valve 15 and the partition wall 13, I may and do preferably provide said disk valve with a rubber gasket or other suitable form of packing ring 20, so arranging said ring that the free or outer face thereof will be brought into setting engagement with the adjacent face of the partition wall 13 in the manner as is shown in the Figure 1, hence, will serve to positively prevent leakage of gases by said disk valve through the port 14 and from thence through the ports 12 and 9 hereinbefore referred to.

The disk valve 15, in turn, is formed with an outlet opening or port 21 adapted to be normally closed through the medium of a smaller disk valve 22 carried on one end of a spring arm 23, the remaining end of which is fixedly secured to a portion of the disk valve 15. In this connection, it will be noted that the direction of movement of the second disk valve 22 is opposite to the path of movement of the disk valve 15, the purpose of which will be presently apparent.

In operation of my improved combined vent and safety attachment, the screw-threaded and tapered end 5 of the inlet nipple 4 is turned into engagement with a suitably screw-threaded opening formed in an appropriate portion of a volatile liquid containing tank 6. In tanks of this character, it is necessary that some means of venting the same shall be provided whereby to permit of the removal or pumping of the volatile liquid, as may be required, therefrom, but at the same time, it is extremly important that subsequently to the pumping of a portion or quantity of volatile liquid from the tank, such tank shall be positively closed to the atmosphere whereby to avoid the loss or wastage of gases therefrom with a subsequent reduction of efficiency in the same. To this end, it will be noted that with attachment of the invention to the tank 6, any desired amount of volatile liquid may be withdrawn or pumped therefrom and with the starting of such a removal or pumping operation, the reduction of pressure within said tank 6 will be such as to impart a suction to the chamber of the casing of the device, thereby drawing the disk valve 15 in a direction away from its port 14 in the partition wall 13 and hence, permitting the inflow of air into said casing by way of the port 9, the port 12 and the then open port 14, thus, materially facilitating the liquid removal or withdrawal. When however, the withdrawal or removal of liquid from the tank is discontinued, the reduced pressure within the said tank will be increased to an extent such as will permit the expansible coiled spring 19 to immediately return the disk valve 15 with its packing 20 into engagement with the partition wall 13 and thereby close the port 14, consequently, avoiding any loss of gases from said tank 6 by way of the port 14 and the ports 9 and 12 aforesaid. Should for any reason, the pressure of gas within the tank 6 increase to an abnormal degree and thus bring about liability of explosion of the tank, a portion of these excess gases will be directed into the chamber of the casing of the device by way of the nipple 4, moving thereinto into engagement with the spring or yieldably closed disk valve 22 by way of the port 21 in the disk valve 15. The spring arm 23 normally holding the disk valve 22 in its closed position will have its resistance counteracted by the pressure of the gas adjacent said valve 22 and consequently upon this, the valve will be moved to a position away from the port 21, thus opening the latter and permitting of the safe escape of the excessive gas pressures from said port 21 through the port 12 and thence through the port 9 into the atmosphere. When the pressure of gas within the tank and in the chamber of the casing of the device has been reduced to normalcy, the spring arm 23 will then act to immediately return said valve 22 to its closed position, and at this time, the further loss of gases from the tank 6 will be prevented.

Due to the interpositioning of the diagonally arranged and ported wall 11 within the section 2 of the casing of the device, it will be understood that a tortuous course will be taken by the gases exhausting from the tank 6 as when excessive pressure is had therein and due to such passage, the excessive agitation of the volatile liquid within the tank by reason of the outrush of gases therefrom will be avoided. Similarly, with the intaking of air by way of the port 9 as when a quantity of liquid is being removed from an equipped volatile liquid containing tank 6, said air will be prevented from rushing into the chamber of the casing of the device in a prohibitive amount, the inflow of the air being kept to that minimum necessary for a proper venting of the tank.

Manifestly, the construction shown is capable of considerable modification and such modification as is within the scope of my claims, I consider within the spirit of my invention.

I claim:

1. A device of the character described comprising a sectional body having a chamber therein, said body having an inlet and an outlet way formed in the same in relative spaced relation, a ported wall in said chamber between said ways, a spring-pressed disk valve normally closing the port of said wall, said valve having a port in the same, a spring-pressed second valve carried by said first valve and normally closing the port therein, said second valve being movable in a direction opposite to the path of movement of the first valve, and a baffle disposed across the chamber within the body portion between said ported wall and the outlet way of the body.

2. A device of the character described comprising a body having a chamber therein provided with relatively spaced inlet and outlet ways, a ported wall in said chamber between the inlet and outlet ways, a disk valve mounted adjacent said ported wall, a supporting guide arranged in the chamber for said valve, spring means engaging said disk valve and supporting guide for normally and yieldably urging the valve over the port in said wall, said disk valve having a port formed in the same, a yieldably mounted valve carried upon said disk valve normally closing the port therein, the path of movement of said second mentioned valve being in a direction opposite the path of movement of the first valve, and a ported baffle diagonally arranged in the chamber within the body between the ported wall and the outlet way thereof.

3. A device of the character described comprising a sectional body forming a chamber, one of the sections of said body being provided with a way, a valve supported in said section, said valve having a port in the same, a second valve normally closing the port of the first mentioned valve, the other section of said body being also provided with a way, a ported wall arranged in said last mentioned section between the way thereof and the way of the first mentioned section, and said ported wall being adapted to be closed by the first mentioned valve.

4. A device of the character described comprising a sectional body forming a chamber, one of the sections of said body being provided with a way, a valve supported in said section, said valve having a port in the same, a second valve normally closing the port of the first mentioned valve, the other section of said body, being also provided with a way, a ported wall arranged in said last mentioned section between the way thereof and the way of the first mentioned section, said ported wall being adapted to be closed by the first mentioned valve, and a baffle disposed in said second mentioned section between the way and ported wall thereof.

In witness whereof I have hereunto set my hand.

VICTOR P. DIEDERICH.